3,764,428
METHOD OF FOAMING FIBROUS FLEECE
Keiji Oshima, Toyonaka, and Yozo Ito and Setsuo Suzuki, Yokohama, Japan, assignors to Sumitomo Bakelite Company Limited, Tokyo, Japan
No Drawing. Continuation-in-part of abandoned application Ser. No. 587,391, Oct. 18, 1966. This application July 15, 1970, Ser. No. 55,293
Int. Cl. B32b 5/20, 31/20
U.S. Cl. 156—78                                      2 Claims

ABSTRACT OF THE DISCLOSURE

A process and structural foamed product produced therefrom in which a powdery composition comprising a thermosetting resin and a foaming agent, which upon heating generates a gas, is sprinkled all over a layer of fibrous fleece, the fibers of which are unbonded to one another. The treated layers are preformed (compressed) at a temperature below the foaming temperature and the curing temperature of the resin. The preformed product is then heated to foam and cure the resin, and simultaneously to expand the fleece together with the resin employed.

---

This is a continuation-in-part application of the copending application Ser. No. 587,391, filed Oct. 18, 1966, now abandoned.

This invention relates to a structural foamed product comprising an expanded fibrous fleece and a foamed thermoset resin wholly filled throughout the interstices among fibres of said expanded fleece, and a method for the production thereof.

As structural foamed products, various synthetic resin foams have heretofore been known, and processes for producing foams using thermosetting resins have been introduced by many patents. For example, a phenol resin foam is prepared, in general, according to a method carried out by incorporating a material generating a gas on heating into a resol type phenol resin or a curing agent-containing novolac type phenol resin, adding thereto, if necessary, a surface active agent, and then heating the mixture to foam and cure the same. Further, foams of urea, epoxy and melamine resin are produced according to processes identical in principle with the above-mentioned method. These thermosetting resin foams, however, are poor in elasticity and flexibility, are liable to be destroyed by application of a slight force, are markedly low in mechanical strength and readily form powdery resin by surface abrasion. These thermosetting resin foams have therefore been used only in fields where mechanical strength is not especially required but thermal insulation or sound absorption is required, and never been used for fields where mechanical strength is required from the structural standpoint. Further, since the foam surface is not particularly decorative, the products have usually been provided with a surface layer of paint or facing materials have been struck onto the surfaces by means of adhesives.

It is an object of the present invention to provide foamed products usable as construction materials, for which purposes thermosetting resin foams have not hitherto found much use, by utilizing, unlike in the case of the conventional thermosetting resin foamed, the strength of a fibrous fleece to impart mechanical strength to the products.

The present invention relates to a process for producing structural, foamed products comprising the steps of sprinkling a layer of fibrous fleece, the fibers of which fibrous fleece are unbonded to one another, with foamable powdery resin composition, comprising a thermosettable resin and a foaming agent which on heating will generate a gas, the penetration of said composition extending throughout the fibrous fleece, preforming, i.e., heating and compressing the thus treated layers in such a suitable manner that foaming can be better accomplished, i.e., the preforming under a pressure at a temperature below the foaming and curing temperature of the resin composition, the preforming thereby providing a consolidated structure of the resin to be foamed and the fibers, and subsequently, the step of heating the preformed product to foam and cure the resin composition, whereupon the fibers and resin expand simultaneously into the surprisingly excellent product of the present invention, with the resin completely filling the spaces therein, to provide a structural, foamed expanded product.

The word "preform" as used herein and in the specification means heating and compressing the treated layer before foaming in such a suitable manner that foaming can be uniformly accomplished. The preformed product is produced by compressing the treated fibrous fleeces at a temperature of about a melting point of the resin, therefore, it is clear that the spaces among the filaments of the fleeces are completely filled up with the resin composition, forming a consolidated product as a result of it. By heating the thus preformed product, the fleece is expanded under the pressure generated by the foaming of the resin, the resultant expanded inter-fibre spaces is filled wholly with the foamed resin, and the obtained structural foamed product proves to have more thickness than before the heat treatment had not been given to it.

The present invention further intends to obtain faces structural foamed products high in mechanical strength and decorative by applying facing materials on the treated layer or a plurality of superimposed treated layer, before or after preforming, and then foaming and curing the thus treated laminate at the same time.

The fibrous fleeces employed in the present invention include fleece-like materials comprising natural organic fibres such as cotton and cotton waste; fibres such as regenerated cellulose staple fibre and cellulose acetate fibre; synthetic fibres such as polyester fibres, polyamide fibres and polyvinyl acetal fibres; and inorganic fibres such as glass fibres, asbestos fibres, rock wool and slag wool. The fleece-like materials used in the present invention must be such that foamable, thermosettable resin composition can be readily introduced among the fibres thereof and that, when subjected to foaming, the fleece automatically expands simultaneously together with the said compositions employed. Therefore, the fibres of said fleeces should be unbonded one to another.

Thermosetting resins usable in the present invention include phenol, urea, melamine and epoxy resins. The phenol resins may be either of the novolac or resol type and are most frequently used in the practice of the present invention by virtue of their high efficiencies. The foaming agents employed are substances which, on heating or heating in the presence of acid, decompose to generated gas, and may be those used in the production of ordinary foams. Examples of such foaming agents are sodium carbonate, sodium bicarbonate, ammonium carbonate, dinitrosopentamethylenetetramine, azobisisobutyronitrile and benzenesulfonylhydrazide.

Curing agents employed may be, in the case of novolac type phenol resins, substances forming methylene-linkage with novolac on heating such as hexamethylenetetramine and anhydroformaldehydeaniline, while in the case of resol type phenol resin, acidic substances may be used as curing agents. In the case of other thermosetting resins, conventional curing agents may be used, if necessary. Further, the presence of surface active agents is useful, to facilitate uniform foaming.

The facing materials which may be employed in the present invention are, for example, papers; organic cloths made of cotton, regenerated cellulose fibres or other synthetic fibres; inorganic cloths made of glass or asbestos fibres; papers impregnated with synthetic resin such as melamine, phenol, urea or vinyl resins, or synthetic resin-impregnated cloths: plates, sheets, films or laminates of synthetic resin such as melamine, benzoguanamine, polyester, diallylphthalate, vinylchloride, styrene or acryl resin; organic sheet-like materials such as hardboard or plywood; metal sheets made of stainless steel, aluminum, iron or zinc; and inorganic sheet-like materials such as asbestos cloth and gypsum board.

In the present invention, the fibres of an expanded fibrous fleece are integrated to each other by means of a thermosetting resin foam, and a foaming pressure generated in heating and foaming the thus treated fibrous fleece is utilized to obtain a molded article of a desired size without applying any external pressure.

In practicing the present invention, there may be adopted various methods. For example, a solid thermosettable resin, a foaming agent and, if necessary, a curing agent and a surface active agent are homogeneously mixed by use, for example, of a mixing roll, "Ko-Kneader," a ball mill or other mixer, at a temperature below the decomposition temperature of the foaming agent and below the curing temperature of the resin, and then the mixture is pulverized to form a powdery resin composition. The thus formed resin composition is sprinkled into a layer of a fibrous fleece, and, if necessary, such treated layer is vibrated to penetrate sufficiently throughout the fleece and depending on the uses of the product, one or more such layers are superimposed to form a laminate. The thus formed laminate is foamed and cured by heating after preforming said laminate by means of press or rolls at below the foaming temperature of the foaming agent, preferably at a temperature about the melting point of the resin, whereby a structural foamed product can be obtained. In some cases, preformed laminatse are superimposed and thereafter the thus obtained assembly is foamed and cured by heating either as it is or after compressing the said assemble at the same temperature as the preforming. Or, it is also possible to get the article having the required thickness by slicing a thicker foamed product. In the above cases, the proportion of the fibrous fleece to the resin composition may vary e.g. from 1% to 100%.

In the method of obtaining the faced structural foamed products, the facing material is pressurized by the foaming pressure and firmly adhere to the foam by means of the foamed resin, without using any adhesive, to form a united ornamental article. However, it is not objectionable to previously apply, if necessary, an adhesive to the facing material. The surface of the final product is free from unevenness and wrinkles and is beautiful in appearance. Various substances may be used as the facing materials depending on the uses of the products, and in the case of a plate-like product, only one side may be faced with a facing material or both sides may be faced with same or different facing materials.

By means of the present invention, it is possible to obtain structural foamed products excellent in mechanical properties as well as in heat-insulating and sound-absorbing properties which are inherent to thermosetting resin foams. Further, depending on the kind of fibres employed, it is possible to obtain products excellent in fire resistance property, mechanical strength and other properties. Products having surfaces of various facing material can be directly used as light weight construction and structural materials.

The structural foamed products obtained in accordance with the present invention can be used for various purposes such as for heat-insulating materials, sound-absorbing materials, core materials and ornamental materials, and especially construction materials for walls, ceilings and doors.

The following examples illustrate the present invention.

EXAMPLE 1

| | Parts by weight |
|---|---|
| Novolac type phenol resin | 500 |
| Hexamethylenetetramine | 50 |
| Dinitrosopentamethylenetetramine | 10 |
| Surface active agent | 10 |

The above components were kneaded for 10 minutes on a two-roll mixer, one roll cooled with water and the other kept at 70° C., and the mixture was pulverized to obtain a powdery resin composition.

43.75 g. of this powdery resin composition was uniformly sprinkled over a layer of 5 g./300 mm. x 300 mm. fibrous cotton fleece, and eight layers treated in the same way were superimposed. The assembly was performed at 80° C., under 1 kg./cm.$^2$, and then the assembly was heated at 140° C. for 30 minutes to be foamed and cured. In this case, there was obtained a product having an apparent specific gravity of 0.10 g./cm.$^3$, a flexural strength of 14.5 kg./cm.$^2$, an impact strength (Izod) of 1.31 kg.-cm./cm.$^2$, a tensile strength of 14 kg./cm.$^2$, and a compressive strength of 5.6 kg./cm.$^2$. A comparable product without fibrous fleece, had a flexural strength of 8 kg./cm.$^2$, an impact strength of only 0.17 kg.-cm./cm.$^2$, and a tensile strength of 5 kg./cm.$^2$.

EXAMPLE 2

| | Parts by weight |
|---|---|
| Powdery urea resin | 350 |
| p-Toluenesulfonylhydrazide | 7 |
| Surface active agent | 7 |
| Ammonium chloride | 3.5 |

The above components were mixed in a ball mill to form a powdery resin composition. 43.75 g. of this powdery resin composition was uniformly sprinkled over a layer of 5 g./300 mm. x 300 mm. fibrous cotton fleece, and eight layers treated in the same way were piled up or superimposed. The assembly was compressed at 50° C. under 20 kg./cm.$^2$ and was then heated at 120° C.–140° C., to be foamed and cured. The resulting structural foamed product had an apparent specific gravity of 0.16 g./cm.$^3$ and a flexural strength of 13.5 kg./cm.$^2$.

EXAMPLE 3

| | Parts by weight |
|---|---|
| Novolac type phenol resin | 500 |
| Hexamethylenetetramine | 75 |
| Dinitrosopentamethylenetetramine | 10 |
| Surface active agent | 10 |

The above components were kneaded for 10 minutes on a two-roll mixer, one roll cooled with water and the other kept at 70° C., and a mixture was pulverized to form a powdery resin composition.

50 g. of this powdery resin composition was uniformly sprinkled over a layer of 5 g./300 mm. x 300 mm. fibrous cotton fleece, and eight layers treated in the same way. The layers were superimposed and the assembly was compressed at 100° C. under 1 kg./cm.$^2$ for 3 minutes. Onto one side of the thus obtained plate-like performed laminate, a 0.6 mm. thick melamine resin decorative sheet was applied, and onto the other side, a phenol resin-impregnated paper. The composite was placed in a mold and was heated at 140° C. for 20 minutes to be foamed and cured. The resulting structural foamed product had excellent heat insulation, sound absorption and thermal resistance properties.

EXAMPLE 4

43.75 g. of powdery resin composition obtained in Example 3 was uniformly sprinkled over a layer of 5 g./300 mm. x 300 mm. staple fibre fleece, and eight layers treated in the same way were superimposed to form a laminate. Onto both sides of the assembly, 0.3 mm. thick aluminium sheets were applied, and then the composite was compressed at 100° C. under 1 kg./cm.$^2$ for 3 minutes. The plate-like performed composite was then placed in a mold and heated at 140° C. for 20 minutes to be foamed and cured. The resulting structural foamed product was a sandwich-structure faced on both sides with aluminium and was excellent as a construction material.

EXAMPLE 5

| | Parts by weight |
|---|---|
| Powdery urea resin | 100 |
| Ammonium chloride | 1 |
| p-Toluenesulfonylhydrazide | 2 |
| Surface active agent | 2 |

The above components were mixed by means of a ball mill to obtain a powdery resin composition. 50.84 g. of this powdery resin composition was uniformly sprinkled over a layer of 5 g./300 mm. x 300 mm. rayon staple fibre fleece. Six layers treated in the same way were superimposed, and the assembly was heated at 50° C. under 2.0 kg./cm.$^2$. Onto both sides of this consolidated structural laminate, polyester resin decorative plywoods were applied, and the composite was placed in a mold and was heated at 130° C. to be foamed and cured. The resulting structural foamed product was a beautiful sandwich-structure of excellent heat insulation properties.

EXAMPLE 6

43.75 g. of powdery resin composition obtained in Example 3 was uniformly sprinkled over a layer of 5 g./300 mm. x 300 mm. rayon staple fibre fleece, and eight layers treated in the same way were superimposed. Onto both sides of this assembly, 0.1 mm. thick vinyl chloride resin decorative sheets were applied, and the composite was compressed at 80° C. under 0.5 kg./cm.$^2$. Subsequently, the plate-like preformed composite was placed in a mold and was heated at 120° C. for 30 minutes to be foamed and cured, whereby a faced structural foamed product was obtained.

EXAMPLE 7

| | Parts by weight |
|---|---|
| Novolac type phenol resin | 500 |
| Hexamethylenetetramine | 60 |
| Dinitrosopentamethylenetetramine | 25 |
| Surface active agent | 5 |

Using the above components, a powdery composition was obtained by the same method as Example 1. This powdery composition was sprinkled over 300 mm. wide fibrous cotton fleece having weight of 5 g./300 mm. x 300 mm., which was provided continuously, so as to be the ratio of resin composition and said fleece, 9:1, by weight. The treated layer was continuously preformed into a consolidated sheet by means of a pair of rolls set at 90° C. The thus obtained preformed sheet was cut into pieces having the length of 300 mm. and said 10 pieces were piled up or superimposed. Thereafter, this assembly was heated to foam and cure under the same condition as Example 1. The obtained structural foamed product had the thickness of 100 mm., and the apparent density of 0.05, from which uniform articles having required thickness were sliced.

What we claim is:

1. A process for producing structural foamed products, comprising the steps of
    sprinkling a layer of fibrous fleece including fibers, said fibers of said layer of fibrous fleece being unbonded to one another, with a powdery foamable composition including a thermosettable resin and a foaming agent, said composition being introduced among filaments of said fibrous fleece, and
    preforming the thus treated layer under a pressure at a temperature below the foaming temperature of said foaming agent and below the curing temperature of said resins, at the melting point of the resin to melt and fluidize, said foamable composition to form a consolidated structure with said foamable composition united with said fleece and completely filling the spaces between the fibers of the fleece with an unfoamed state of said foamable composition, and, heating the preformed product to foam and cure said foamable composition, simultaneously, so as to greatly expand said fleece together with said resin, by pressure generated during the foaming completely filling the voids among said filaments.

2. The process, as set forth in claim 1, further comprising
    the step of applying facing material to the preformed product.

References Cited

UNITED STATES PATENTS

| 3,025,202 | 3/1962 | Morgan et al. | 264—Dig. 7 |
| 3,154,604 | 10/1964 | McMillan | 264—45 |

WILLIAM J. VAN BALEN, Primary Examiner

U.S. Cl. X.R.

161—159, 170; 264—47

UNITED STATES PATENT OFFICE
CERTIFICATE OF CORRECTION

Patent No. 3,764,428        Dated October 9, 1973

Inventor(s) Keiji Oshima et al.

It is certified that error appears in the above-identified patent and that said Letters Patent are hereby corrected as shown below:

On the cover sheet insert:

-- [30] Foreign Application Priority Data

Japan        October 21, 1965        64/159/65 --.

Signed and sealed this 29th day of October 1974.

(SEAL)
Attest:

McCOY M. GIBSON JR.        C. MARSHALL DANN
Attesting Officer        Commissioner of Patents